March 31, 1942. O. C. ROSCOE 2,278,150

ELECTRIC SEED PLANTER

Filed Aug. 9, 1940

O. C. Roscoe
INVENTOR.

BY *CA Snow & Co.*

ATTORNEYS.

Patented Mar. 31, 1942

2,278,150

UNITED STATES PATENT OFFICE 2,278,150

ELECTRIC SEED PLANTER

Odis C. Roscoe, Shreveport, La.

Application August 9, 1940, Serial No. 352,015

1 Claim. (Cl. 111—82)

This invention relates to an electric seed planting device or dispenser designed for sowing small seed, such as flower and vegetable seed, the primary object of the invention being to provide a device of this character which will deposit the seed evenly along the row, thereby eliminating waste due to irregular planting.

Another object of the invention is to provide means for planting expensive flower and vegetable seed in such a manner that waste caused by the necessary thinning of cuddling of small growing plants, is eliminated.

A further object of the invention is to plant seeds so that the plants may grow to potted size in their original flats, or planed locations, thereby saving the time usually required in transplanting before potting the growing plants.

With foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing.

Figure 1:
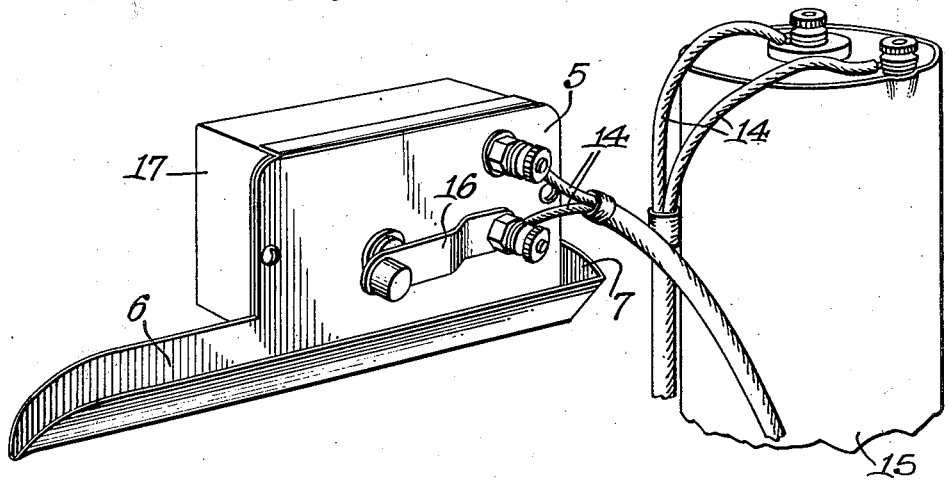
Figure 1 is a perspective view of a planting device constructed in accordance with the invention.
Figure 2:
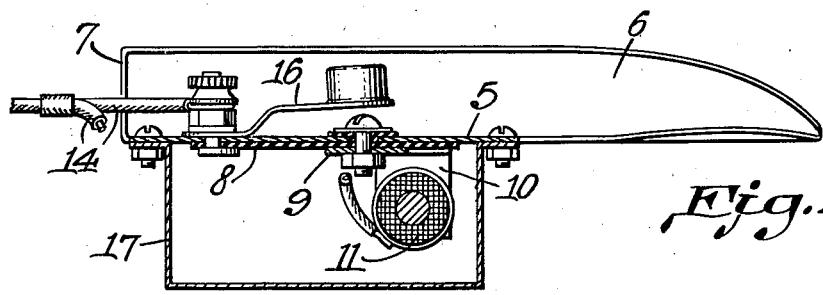
Figure 2 is a transverse sectional view through the body portion of the device.
Figure 3:
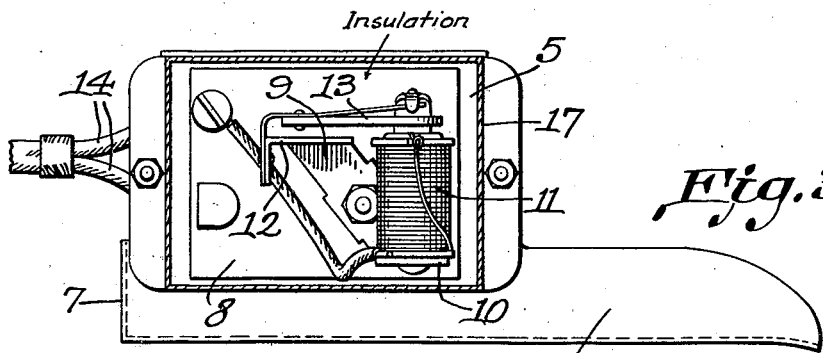
Figure 3 is a longitudinal sectional view taken at right angles to Figure 2.

Referring to the drawing in detail, the device comprises a supporting plate indicated generally by the reference character 5, the supporting plate having the trough 6 formed along the lower edge thereof, one end of the trough extending an appreciable distance beyond one edge of the supporting plate, where it is open to discharge seed therefrom. The opposite end of the trough is closed as at 7 to prevent seed from passing from the trough at this end of the trough, as the device is tilted upwardly to prevent the discharge of seed through the open end of the trough.

An insulating plate indicated at 8 is secured to the rear surface of the supporting plate 5, and provides a mounting for the electrical element of the device. Secured to the insulating plate 8, is a bracket 9 that has an outwardly extended arm 10 to which the vibrator coil 11 is secured. An outwardly extended arm 12 also forms a part of the bracket 9, and provides a support for the vibrator 13 which is caused to vibrate when electric current passes through the vibrator coil 12. Electric energy is supplied to the vibrator coil through the wires 14 leading from the battery 15, there being provided a switch member 16 which is also in circuit with the wires 14, the switch controlling the electric current passing through the vibrator coil.

A box like cover indicated at 17 is secured over the vibrator coil and vibrator, the box like cover providing means whereby the device may be conveniently held in the hand of the user.

In the use of the device, seeds are placed in the trough, and the user moves the device along over a furrow to be planted with small seed. By pressing the switch 16 and completing the circuit to the vibrator, the trough is caused to vibrate in the hand of the user which results in seed being discharged from the trough, at the open end thereof. By tilting the device in the hand of the user, the amount of seed planted may be readily regulated, to meet various requirements.

What is claimed is:

A hand-feeding device for use in planting exceptionally small seeds, comprising a body portion embodying a wide plate, a trough formed along one edge of the plate and having an open discharge end, said trough adapted to contain seed to be planted, electrical means including a vertically movable vibrator, secured to the wide plate and adapted to vibrate the trough vertically whereby seeds contained therein are discharged from the open end of the trough, a switch mounted on the plate and adapted to control the electrical means, and a cover for said electrical means, said cover adapted to be gripped by the hand of the person using the planter in supporting the planter while in use in planting seeds.

ODIS C. ROSCOE.